Sept. 1, 1931.  F. A. COWAN  1,821,005

GAIN MEASURING APPARATUS

Filed March 1, 1930

INVENTOR
F. A. Cowan
BY
ATTORNEY

Patented Sept. 1, 1931

1,821,005

UNITED STATES PATENT OFFICE

FRANK A. COWAN, OF EAST ORANGE, NEW JERSEY, ASSIGNOR TO AMERICAN TELEPHONE AND TELEGRAPH COMPANY, A CORPORATION OF NEW YORK

GAIN MEASURING APPARATUS

Application filed March 1, 1930. Serial No. 432,505.

This invention relates to repeaters suitable for electrical circuits, and more particularly to arrangements for measuring repeater gains.

This invention discloses an arrangement for indicating the gain of a repeater. Two rectifiers are connected respectively to opposite sides of the repeater, and a measuring device is used for receiving the currents derived from these rectifiers. The rectified currents produce opposing torques on the movement of the measuring device, thereby providing an indication of the gain of the repeater.

Figure 1:
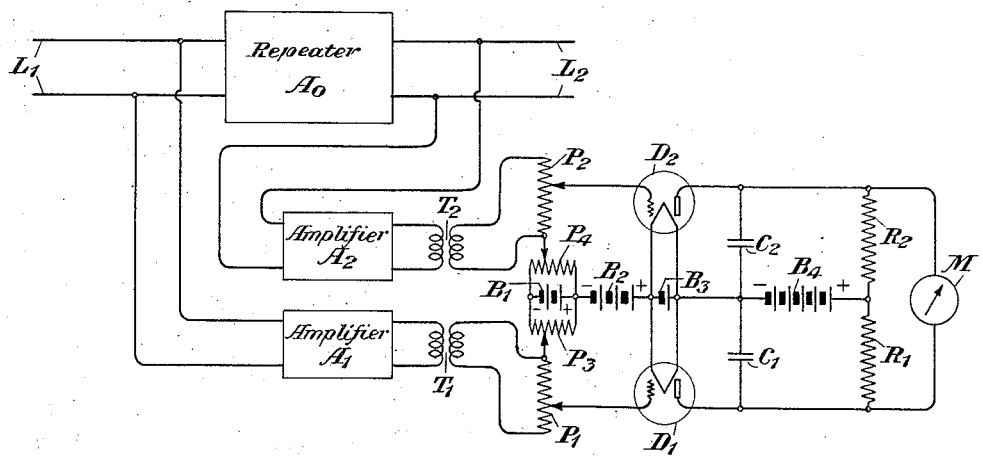
Figure 2:
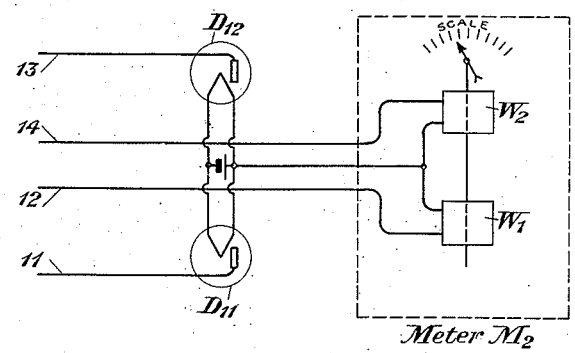

This invention will be better understood from the detailed description hereinafter following, when read in connection with the accompanying drawings in which Figure 1 shows one form of the invention, and Figure 2 shows an arrangement including two two-element rectifying tubes and a measuring device having two coils, all of which may be employed in carrying out the principles of this invention.

Referring to Fig. 1 of the drawings, the reference character $A_0$ represents a repeater interconnecting a line $L_1$ with a line $L_2$. Voice frequency signals, or currents of any other type, may flow over line $L_1$. These will be transmitted to line $L_2$ through the repeater $A_0$. As is well known the repeater $A_0$ is employed for amplifying currents in line $L_1$ which are to be impressed on the line $L_2$. This repeater may vary in its gain, and according to this invention, arrangements will be described for determining whether the gain of the repeater has increased or decreased, and the extent of any change in its gain. The repeater may be of any type well known in the art, and it preferably includes a potentiometer suitable for changing its gain by any desired amount.

Amplifiers $A_1$ and $A_2$ bridge the lines $L_1$ and $L_2$ respectively at the input and output sides of the repeater $A_0$. These amplifiers may be of any well known type, each preferably including a high impedance input circuit in order that a minimum of current may be diverted from lines $L_1$ and $L_2$. By keeping the input impedances of these amplifiers very high, the transmission loss of the measuring apparatus to be subsequently described, will be practically negligible. Each of these amplifiers may also include a potentiometer for the adjustment of its gain.

Amplifiers $A_1$ and $A_2$ are coupled by transformers $T_1$ and $T_2$ to detectors which include vacuum tubes $D_1$ and $D_2$ respectively. The secondary windings of the transformers $T_1$ and $T_2$ are connected to the fixed terminals of potentiometers $P_1$ and $P_2$ respectively. The fixed terminals of two other potentiometers designated $P_3$ and $P_4$ are connected across the terminal electrodes of a battery $B_1$ as shown. The grid electrodes of the tubes $D_1$ and $D_2$ are connected to the movable arms of potentiometers $P_1$ and $P_2$ respectively. A battery $B_2$ is interposed between the positive terminal of battery $B_1$ and both of the filament electrodes of tubes $D_1$ and $D_2$. These filament electrodes are connected in parallel relationship with each other and they are bridged by a battery $B_3$. Battery $B_3$ provides the current required to heat these filament electrodes to incandescence. A battery $B_4$ is connected in common to the plate electrodes of the tubes $D_1$ and $D_2$ through resistances $R_1$ and $R_2$ respectively, and these resistances should have equal values. The battery $B_4$ produces the proper operating potentials for the plate electrodes of tubes $D_1$ and $D_2$. A meter M is connected between the plate electrodes of tubes $D_1$ and $D_2$ and this instrument may be any form of zero-center ammeter, preferably of the D'Arsonval type, and capable of indicating the presence of small currents. The plate and filament electrodes of tubes $D_1$ and $D_2$ are shunted by condensers $C_1$ and $C_2$ respectively, and these condensers are employed for presenting paths of very low impedance for alternating currents.

The arrangement shown in Fig. 1 of the drawings, operates on the principles of the Wheatstone bridge. Resistances $R_1$ and $R_2$ form two of the arms of the bridge. The resistances between the plate and filament electrodes of tubes $D_1$ and $D_2$ form the other two arms of the bridge. The battery $B_4$ is connected as one diagonal, and the zero-center meter M as the other diagonal. When no current flows through potentiometers $P_1$ and $P_2$, the direct current resistances presented by the plate and filament electrodes of tubes $D_1$ and $D_2$ may be made equal to each other by the adjustment of the potentiometers $P_3$ and $P_4$ respectively. The potentiometers $P_3$ and $P_4$ merely control the biases of the grid electrodes of the tubes $D_1$ and $D_2$ and these may become such that the resistances of the plate and filament electrodes of tubes $D_1$ and $D_2$ for direct currents will be equal. An equality will be indicated by a zero deflection of the pointer of the meter M.

If an alternating current of a particular frequency, or a plurality of currents of different frequencies are simultaneously impressed on the potentiometers $P_1$ and $P_2$, the bridge may again be balanced by manipulation of the movable arms of potentiometers $P_1$ and $P_2$ until the alternating current grid voltages due to these currents are such as to make the plate-filament resistances of these tubes equal. The value of these plate-filament resistances will be somewhat different from those obtained when no current was impressed upon the potentiometers $P_1$ and $P_2$. The balanced condition of the bridge will again be indicated by a zero deflection of the pointer of the meter M.

The level of the current transmitted by the amplifier $A_2$ will be greater than that current transmitted by amplifier $A_1$, by the gain of the repeater $A_0$. The potentiometers $P_1$ and $P_2$ may be so adjusted that when the levels of the currents transmitted by amplifiers $A_1$ and $A_2$ differ by some predetermined amount, i. e. the gain assigned to repeater $A_0$, the bridge will be balanced and the meter will indicate the balanced condition. It is indeed desirable that amplifiers $A_1$ and $A_2$ have the same number of tubes and the same general circuit arrangement, so that variations in temperature and in the battery voltages will affect both of these amplifiers in the same manner.

When the gain of repeater $A_0$ increases, the amplitude of the current transmitted by amplifier $A_2$ will be increased with respect to the amplitude of the current transmitted by amplifier $A_1$. In that event, the resistance between the plate and filament electrodes of detector tube $D_2$ will be changed with respect to the resistance between the plate and filament electrodes of detector tube $D_1$, unbalancing the bridge and the pointer of the meter M will be deflected by an amount corresponding to the change in these plate-filament resistances. Whenever the gain of the repeater drops below its assigned value, the bridge will again become unbalanced, and the pointer of the meter M will be deflected in the opposite direction. The deflection of the pointer will indicate the extent of the change in the gain of the repeater.

If the repeater $A_0$ is giving its normal gain and the potentiometers $P_1$ and $P_2$ are set to produce zero deflection of the pointer of meter M, then any change in the gain of repeater $A_0$ will cause a deflection. The pointer of the meter M may be restored to its zero position by readjustments of either of the potentiometers $P_1$ or $P_2$ or by changing the gain of either amplifiers $A_1$ or $A_2$. If these potentiometers or the gain controls of the amplifiers $A_1$ and $A_2$ are calibrated in decibels, then these changes will measure the change in the gain of the repeater $A_0$.

By proceeding in the following manner, the gain of the repeater $A_0$ may be accurately determined. The inputs of amplifiers $A_1$ and $A_2$ may be connected to a common alternating current source. Potentiometer $P_2$ may be calibrated in decibels, the zero reading being located at the upper terminal of this potentiometer. When this potentiometer rests at that terminal, potentiometer $P_1$ may be adjusted until the pointer of meter M gives a zero deflection. If amplifiers $A_1$ and $A_2$ are then connected to the repeater $A_0$, as shown, potentiometer $P_2$ may be readjusted to cause the pointer of meter M to return to its zero position. The indication provided by potentiometer $P_2$ will directly give the gain of repeater $A_0$.

By suitably calibrating the scale of meter M and by properly adjusting the potentiometers $P_1$ and $P_2$ until the alternating voltages on the grids of the detector tubes $D_1$ and $D_2$ have predetermined values when the repeater $A_0$ exhibits its normal gain, then the deflection of the meter M will indicate the change in the repeater $A_0$.

Fig. 2 shows an arrangement including two two-element vacuum tubes $D_{11}$ and $D_{12}$ which may be used for rectifying purposes, and which produce independent effects upon separate windings $W_1$ and $W_2$ of the meter $M_2$. The currents through windings $W_1$ and $W_2$ form opposite torques which act simultaneously to produce the deflection of the pointer of the meter.

Conductors 11 and 12 may extend to the secondary winding of transformer $T_1$, and the conductors 13 and 14 may extend to the secondary winding of transformer $T_2$. If the amplifier $A_2$ is arranged to transmit current having an amplitude equal to that transmitted by amplifier $A_1$ when the gain of the repeater $A_0$ is at its assigned value, then equal currents will flow through the windings $W_1$ and $W_2$. The circuit which carries the current energizing winding $W_1$ includes conductor 11, the plate and filament electrodes of detector $D_{11}$, winding $W_1$ and conductor 12. It will be apparent that when the amplifiers $A_1$ and $A_2$ transmit equal currents, the gain of amplifier $A_1$ will be less than that of amplifier $A_2$, by the size of the gain of the repeater $A_0$.

If the gain of the repeater $A_0$ increases, then the output of the amplifier $A_2$ will be greater than the output of the amplifier $A_1$, by the extent of the increase in the gain of the repeater, and more current will flow through winding $W_1$ than through winding $W_2$. In that event, the pointer of the meter will be deflected in one direction and the size of the deflection will be dependent upon the change in the gain of the repeater $A_0$. Similarly, if the gain of the repeater decreases, the magnetic effect produced by winding $W_2$ will be greater than that produced by winding $W_1$, and the pointer of the meter will be deflected in the opposite direction to the extent to which the gain of the repeater $A_0$ has decreased.

The two paths formed by amplifiers $A_1$ and $A_2$ and the corresponding detector circuits, may be designed so as to have a substantially flat transmission characteristic for all frequencies within any desired range. Thus, the transmission characteristic may be substantially uniform for all frequencies within the voice frequency range. A telephone conversation transmitted over line $L_1$ may then be employed for energizing the various circuits to indicate whether the gain of the repeater $A_0$ is greater or less than its assigned value, as well as the extent of the deviation of the gain of the repeater from that assigned value.

The pointer, or other moving element of the meter M, may be mechanically coupled to the movable arm of the potentiometer which may be included in the repeater $A_0$, so that the gain of the repeater may be adjusted in accordance with the deflections of the moving element. When the moving element is deflected to one side of the scale, the gain of the repeater will be changed in one direction, and upon deflection to the other side of the point marked zero on the scale, the gain will be changed in the opposite direction. Accordingly, the apparatus of this invention may be employed to maintain the gain of the repeater $A_0$ constant within very narrow limits.

While this invention has been disclosed in certain particular arrangements merely for the purpose of illustration, the general principles of this invention may be applied to other and widely varied organizations without departing from the spirit of the invention and the scope of the appended claim.

What is claimed is:

In a system for determining changes in the gain of a repeater, the combination of two amplifiers connected respectively to the input and output circuits of the repeater, said amplifiers having high impedance input circuits, the amplifier connected to the input circuit of the repeater magnifying the current transmitted thereby to a greater extent than the current transmitted by the amplifier connected to the output circuit, two potentiometers, two vacuum tube detectors coupled respectively to said amplifiers through said potentiometers, and a measuring device connected to both rectifiers simultaneously acted upon by the currents derived from said rectifiers.

In testimony whereof, I have signed my name to this specification this 28th day of February, 1930.

FRANK A. COWAN.